United States Patent
Koul et al.

(10) Patent No.: US 6,326,441 B1
(45) Date of Patent: Dec. 4, 2001

(54) COMPENSATED SULPHONATED POLYANILINE AND A PROCESS FOR THE PREPARATION THEREOF

(75) Inventors: Saraswati Koul; Sundeep Kumar Dhawan; Subhas Chandra, all of New Delhi; Ramesh Chandra, Delhi, all of (IN)

(73) Assignee: Council of Scientific and Industrial Research (IN)

( * ) Notice: Subject to any disclaimer, the term of this patent is extended or adjusted under 35 U.S.C. 154(b) by 0 days.

(21) Appl. No.: 09/504,187

(22) Filed: Feb. 15, 2000

(30) Foreign Application Priority Data

Jan. 18, 2000 (IN) .............................................. 28/DEL/2000

(51) Int. Cl.$^7$ .................................................. C08G 73/00
(52) U.S. Cl. .............................................................. 525/540
(58) Field of Search ................................................ 525/540

(56) References Cited

U.S. PATENT DOCUMENTS 5,137,991 * 8/1992 Epstein .................................. 525/540
5,164,465 * 11/1992 Epstein .................................. 525/540
5,645,890   7/1997 MacDiarmid et al. .............. 427/302

FOREIGN PATENT DOCUMENTS 0813212   5/1999 (EP) .
9840881   9/1998 (WO) .

* cited by examiner

*Primary Examiner*—Patricia A. Short
(74) *Attorney, Agent, or Firm*—Ladas & Parry

(57) ABSTRACT

This invention relates to sulphonated polyaniline as water soluble polymer useful for corrosion inhibition and process for the preparation of said polymer. A preferred sulphonated polyaniline is shown in the formula below

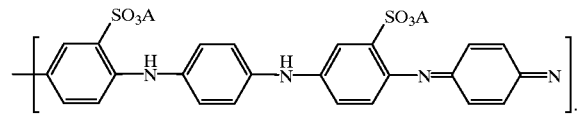

11 Claims, 5 Drawing Sheets

LEUCOEMERALDINE (a)

EMERALDINE BASE (b)

X⁻ = DOPONT
CONDUCTING POLYANILINE (c)

SULPHONATED POLYANILINE (d)

WATER SOLUBLE POLYANILINE (e)

where ( A = $Na^+$, $K^+$, $Li^+$ )

VARIOUS FORMS OF POLYANILINE AND SILPHONATED POLYANILINE

COMPENSATED SULPHONATED POLYANILINE AND A PROCESS FOR THE PREPARATION THEREOF

FIELD OF INVENTION

The present invention relates to sulphonated polyaniline as a water soluble polymer useful for corrosion inhibition and process for the preparation of the said polymer.

More particularly the invention relates to a compensated sulphonated polyaniline as shown in the formula below and a novel process for the preparation of the said polymer.

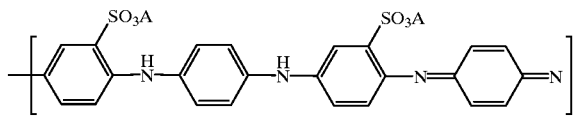

WATER SOULBLE POLYANILINE

Where (A=$Na^+$, $K^+$, $Li^+$).

BACKGROUND OF INVENTION

The water soluble polyaniline of the present invention finds various applications as an corrosion protection of iron and mild steel in HCl medium and saline water.

There has been recently an increased interest in conducting polymer polyaniline (PANI), which has been studied extensively because of its unique proto-electron conduction mechanism. Epstein et al. in "Effect of Sulfonic Acid Group on Polyaniline Backbone", J. Am. Chem. Soc. 113 (1991) 2665–71 describes results on preperation and characterization of a self-doped conducting polymer (SPAN). J. Yue et al. in "Comparison of different synthetic routes for sulphonation of polyaniline", Polymer, 33 (1992) 4410–4418 has explained various routes and the effect of nature of oxidant, time duration and the effect of temperature on the formation of final product (SPAN). In this paper, characterization of all the products formed by different routes has also been studied although the starting precursor for all routes are same. N. Kuramoto et.al. in "Modification of Growth rate and structure of electropolymerized aniline by sodium polyvinyl sulphonate", J. Chem. Soc. Chem. Comm., (1990) 1478 have described the influence of polyvinyl sulphonate on the electropolymerization of aniline which modifies the electroactive and redox properties of the resultant film. In an another paper, J. Yue and A. J. Epstein in "Electronic control of pH at sulfonated polyaniline electrodes", J. Chem. Soc. Chem. Commu. (1992)1540 has studied the electrochemical modulation of self doped sulfonated polyaniline which can be used as a pH modulator. H. S. O. Chan et.al. in "Phosphonic doped emeraldine base", Macromolecules 27 (1994) 2159–64 explain better thermal stability without loss of a dopant species when polyaniline is doped with phosphonic acid esters. A recent paper by X. L. Wei ,Y. Z. Wang C. Bobeczko and A. J. Epstein on "Synthesis and Physical Properties of highly Sulphonated Polyaniline",J. Am. Chem. Soc. 118 (1996) 2545–2555) explains the details of synthesis and extensive characterization of LEB-SPAN. A paper by A. Talo et.al. "PANI/EPOXY coatings with good anticorrosion properties" Synth. Metals 85 (1–3) (1997) 1333–34 explains the complete electrochromical phenomenon of corrosion in presence of Hcl and also in presence of NaCl. A complete study of X-Ray Photoelectron spectroscopic study for corrosion protection of iron/steel by Emaraldene Base has been studied by M. Fahlman, S. Jasty, A. J. Epstein in "Corrosion Protection of Iron/Steel by EB PANI—an X-Ray Photoelectron Spectroscopy study", Synth. Metals 85 (1–3) (1997) 1323–26. Genies et al. in "Polyaniline—A Historical survey", Synthetic Metals, 36 (1990) 139–82 describes a detailed study on the electrochemical and chemical polymerization, redox mechanism and electrochemical properties of polyaniline. Another study related to corrosion is done by P. J. Kinlen et al "Corrosion protection using PANI coating formulation ", Pitture Vermici Eur 73 (17) (1997) 4847–53, in which PANI is used alongwith crylic resin primers and this also includes the whole study of salt fog tesdting done with PANI coatings. I V Yagova, S S Ivanov and V V Yagov in "Aniline based anodically polymerised coatings for corrosion—hydrogenation protection of steel," Prot. Met. 34(1) (1998) 51–53 have explained the effect of aniline polymerised coatings on the rate of corrosion A complete systematic study of PANI along with a series of epoxides has been reported by T. Page Mcandrew et al in "PANI in corrosion -resistant coating", ACS Symp. Ser. 689 (1998) 396–408. This paper also reports about good corrosion results of PANI especially when it is blended with other epoxides and diisocyanates. U.S. Pat. Nos. 5,164,465; 5,008,041; 789 095; WO 96 14, 343; WO 97 03, 127; WO 97 14, 729 had given detailed data of self protonated polyaniline, preparation of high molecular weight polyaniline and preparation of electrically conducting PANI salts having solubility in organic solvents and use of PANI coating formulations for corrosion protection. Reacting polyanilines with sultones can introduce an alkyl sulfonic acid group on the nitrogen atom of polyanilines (U.S. Pat. No. 5,641,859). Dehydrogenating polyanilines of emeraldine base with sodium hydroxide and then reacting with propane sultone, the reaction product, poly(aniline-co-sodium N-propane sulfonate aniline) exhibited relatively good water solubility, however since it is in undoped state, treatment with H-form ion exchange resin might be necessary to obtain green aqueous solution of poly(aniline-co-N-propanesulphonic acid aniline). Naguen and Diaz (macromolecules, 28 (1995) 3411 have synthesized copolymer of aniline and o-anthranlic acid which are soluble in alkaline aqueous solutions but they have a problem of low solubility in water. U.S. Pat. No. 5645890 (1997) provides an improved method of inhibiting the corrosion of metal substrate by applying a chemically deposited polyaniline on exposed surface of iron substrate SS-304 and SS-340. U.S. Pat. No. 589170 (April 1999) relates to a process for the water soluble self acid doped polyaniline which are prepared by reacting polyaniline derivatives with 2-sulphobenzoic anhydride in the presence of pyridine and N-methylpyrrolidinone and treating the reaction product with ion excahnge resin to convert into doped state. Japanese patents No. JP1092,220 (98 92,220); JP 0987,575 (97 87.515) and JP 06003813 (A2 94 0114)have given a description of water based electrically conductive PANI composites; manufacture of PANI based conductive polymer and technological uses of SPAN with its application to processibility.

OBJECTS OF THE INVENTION

The main object of the present invention is to provide a process for the preparation of compensated sulphonated polyaniline as a water soluble polymer useful for corrosion inhibition which obviates the drawbacks mentioned above.

Another object of the present invention is to provide a polymer useful as corrosion inhibitor of iron and mild steel in HCl and saline water medium.

Yet another object of the present is to provide a polymer which is thermally stable upto 320° C.

DESCRIPTION OF DRAWINGS

In the drawings accompanying this specification:

FIG. 2 (curve b) represents a graph showing UV-visible absorption spectra of self p-rotonated polyaniline in dimethyl sulphoxide (DMSO). The absorption bands observed in DMSO lie at 330 nm, 460 and 620 nm.

FIG. 2 (curve c) represents a graph showing UV-visible absorption spectra of compensated self protonated polyaniline in water. The absorption band maxima lies at 259 nm, 311 and 534 nm.

FIG. 2 (curve d) represents a graph showing UV-visible absorption spectra of C-SPAN in methanol. The band value observed in the present case lies at 260 nm and 535 nm.

FIG. 3 (curve b) represents a graph showing UV-visible absorption spectra of 200 ppm of C-SPAN in 1.0 N HCl (in which Fe electrode was dipped for 30 minutes). The absorption spectra shows bands at 420 nm, 540 nm and 979 nm. However the absorption spectra of C-Span in water show bands at 259,310 and 534 nm. The appearance of bands at 420 and 979 nm shows the presence of charged moities in the polymeric backbone.

FIG. 3 (curve c) represents a graph showing UV-visible absorption spectra of 300 ppm of NaSPAN in 1.0 N HCl (in which Fe electrode was dipped for 30 minutes).

FIG. 3 (curve d) represents a graph showing UV-visible absorption spectra of 400 ppm of NaSPAN in 1.0 N HCl (in which Fe electrode was dipped for 30 minutes). UV-visible absorption spectra show absorption bands at 440 nm, 551 nm and 979 nm.

FIG. 5 (a) corresponds to the DSC of compensated polyaniline at a scan rate of 20° C./min on going from 50° C. to 400° C. and 5(b) corresponds to the rescanning of the DSC (after cooling the system from 400° C. to 50° C.) from 50° C. to 400° C.

SUMMARY OF THE INVENTION

Figure 1:
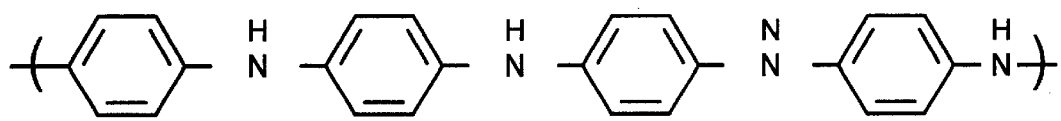
FIG. 1 represents a graph showing forms of polyaniline and sulphonated polyaniline. The complete reduced form of polyaniline is leucoemeraldine as shown in (a) whereas the emeraldine base as shown in (b) consists of 50% reduced and 50% oxidized benzenoid and quinoid repeat units. The doping of the emeraldine base leads to the formation of conducting polyaniline as shown in (c). The sulfonation of the emeraldine base leads to the formation of sulphonated polyaniline as shown in (d) whereas water soluble compensated sulphonated polyaniline as shown in (e) is obtained by the treatment of sulphonated polyaniline with alkali hydroxides.
Figure 1:
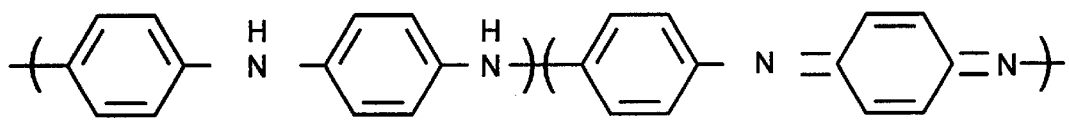
Figure 1:
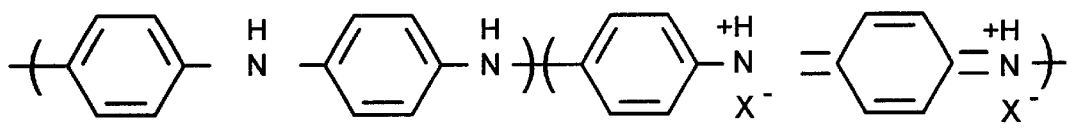
Figure 1:
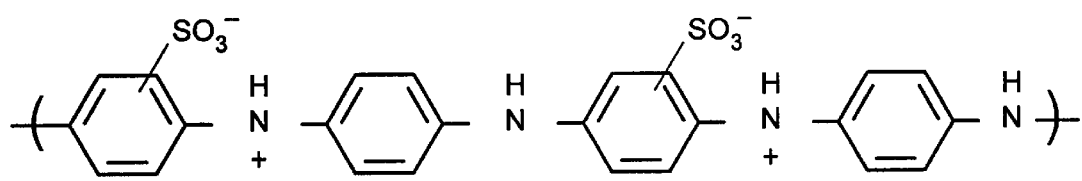
Figure 1:
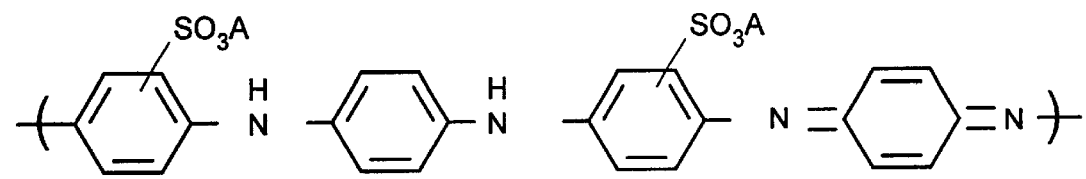
Figure 2:
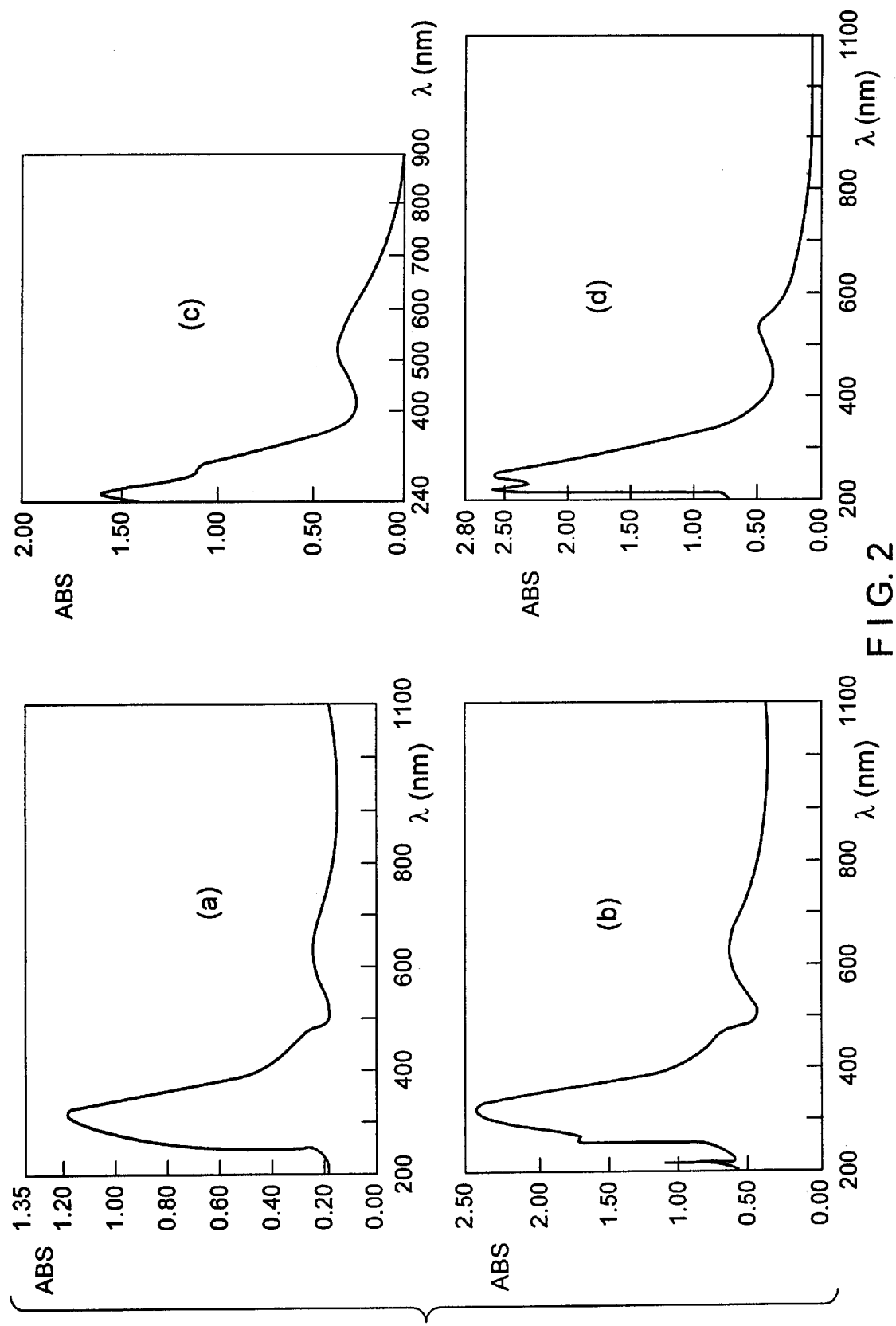
FIG. 2 (curve a) represents a graph showing UV-visible absorption spectra of self p-rotonated polyaniline in N-methyl pyrrolidinone (NMP). The absorption bands observed are 320 nm, 461 and 633 nm.
Figure 3:
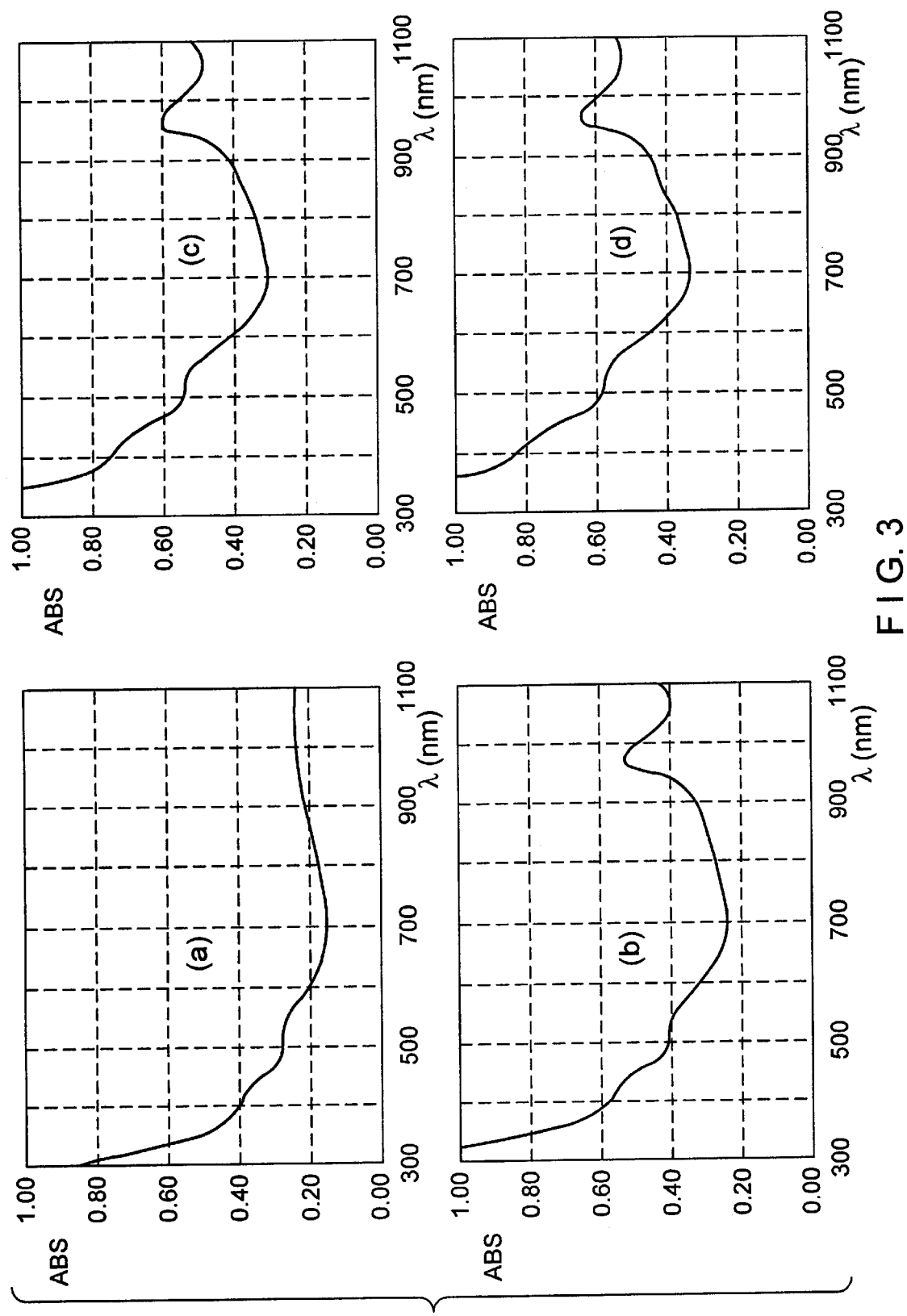
FIG. 3 (curve a) represents a graph showing UV-visible absorption spectra of 100 ppm of C-SPAN in 1.0 N HCl (in which Fe electrode was dipped for 30 minutes). UV spectra shows bands at 420 nm, 540 nm and 979 mn.

In the present invention, we have prepared a polymer soluble in water which can be used for the corrosion protection of iron and mild steel in corrosive medium like HCl and saline water. The crystallinity observed for the water soluble polymer has not been observed by any other group and the novelty of the present invention resides in the use of this polymer as a corrosion inhibitor for iron and mild steel in HCl and NaCl. The novelty of the present invention lies in making a polymer water soluble by suitably treating the same with sulphur based compound and alkali hydroxides.

The inventive step is in attaching a sulphonated group to the polymer backbone.

DETAILED DESCRIPTION

The present invention provides a process for the preperation of compensated sulphonated polyaniline as a water soluble polymer useful for corrosion inhibition which comprises:

(i) adding oleum to a polymer at a temperature in the range of −5° C. to 5° C., (ii) stirring the mixture as obtained in (i) continously under cooling for a period in the range of 4–6 hours (iii) completely digesting the polymer in oleum for a period in the range of 24 hours to 48 hours to yield sulphonated polymer (iv) regenerating the digested polymer in a mixture of organic solvent and water to get a green precipitate which is then filtered to obtain a green cake;

(v) drying the green cake so obtained in step (iv) at a temperature in the range of 50 to 60° C.;

(vi) digesting the green cake so obtained in step (v) in an alkali hydroxide solution (vii) drying the solution so obtained in step (vi) at a temperature in the range of 70° C. to 80° C. to obtain compensated sulphonated polyaniline water soluble polymer for corrosion inhibition.

In another embodiment of the present invention, the polymer used may be selected from a group consisting of emeraldine base, leucoemeraldine.

In another embodiment of the present invention, the sulphur based chemical used is oleurn in the range of 24–60%

In still another embodiment of the present invention, the organic solvent used for regeneration as a mixture with water is selected from a group consisting of methanol, ethanol, isopropanol.

In yet another embodiment of the present invention, the mixture of the organic solvent and water is in the range of 80:20 to 90:10%.

In still another embodiment of the present invention, the alkali hydroxide is selected from a group consisting of sodium hydroxide, lithium hydroxide and potassium hydroxide.

In yet another embodiment of the present invention, the strength of the alkali hydroxide is in the range of 0.1 to 1.0 M In still another embodiment of the present invention, the water soluble polyaniline prepared by the process of present invention is crystalline in nature.

In a further embodiment of the present invention, the polymer may be used in the system as cooling towers, pipelines, ballast tanks and oil and gas production units where metals like iron are susceptible for corrosion.

In another embodiment of the present invention, the quantity required for its use as corrosion inhibitor is in the range of 200–500 ppm.

The present invention further provides a compensated sulphonated polyaniline having following characteristics:
(i) thermal stability upto 320° C. (ii) environmentally stable in the presence of air and moisture (iii) orthorhombic crystalline nature (iv) sharp melting point of 251.06° C. and crystallization temperature of 180.60° C. (v) is water soluble and (vi) is a corrosion inhibitor.

Accordingly the present invention further provides a water soluble compensated sulphonated polyaniline which can be useful as corrosion inhibitor of iron and mild steel.

Figure 4:
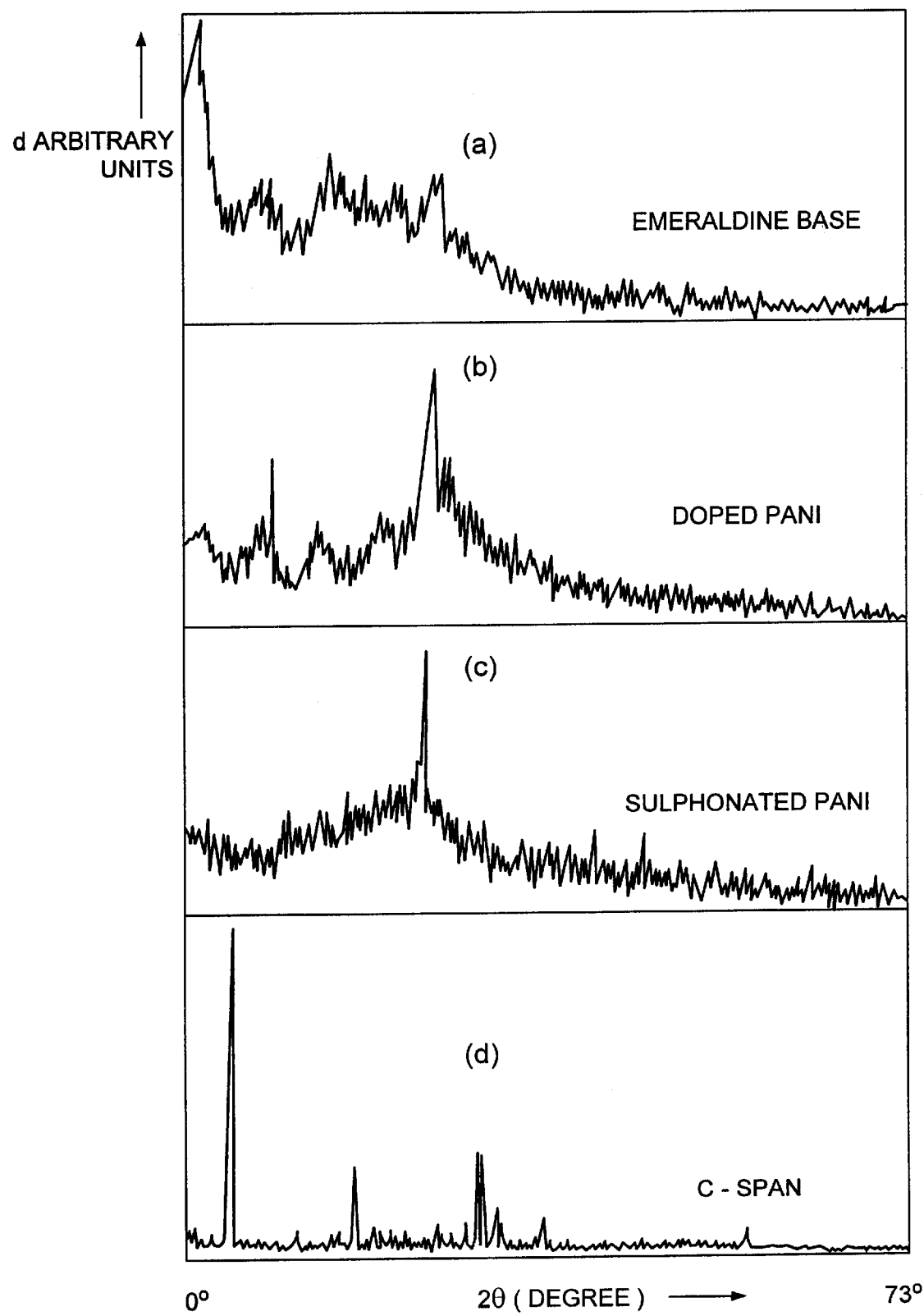
FIG. 4(a) represents a graph showing XRD analysis of emeraldine base, 4(b) for doped polyaniline, (4c) represents XRD analysis for sulphonated polyaniline and (4d) represents XRD analysis for compensated sulphonated polyaniline. The XRD data clearly indicates the amorphous nature of the parent polymer emeraldine base or its doped form and sulphonated polyaniline whereas higher degree of crystalinity is observed in case of compensated sulphonated polyaniline. The fraction crystalinity estimated by comparing the integerated intensity of the peaks above the amorphous hump intensity shows that the degree of crystillinity of the compensated polymer compred to the parent polymer is 91%.
Figure 5:
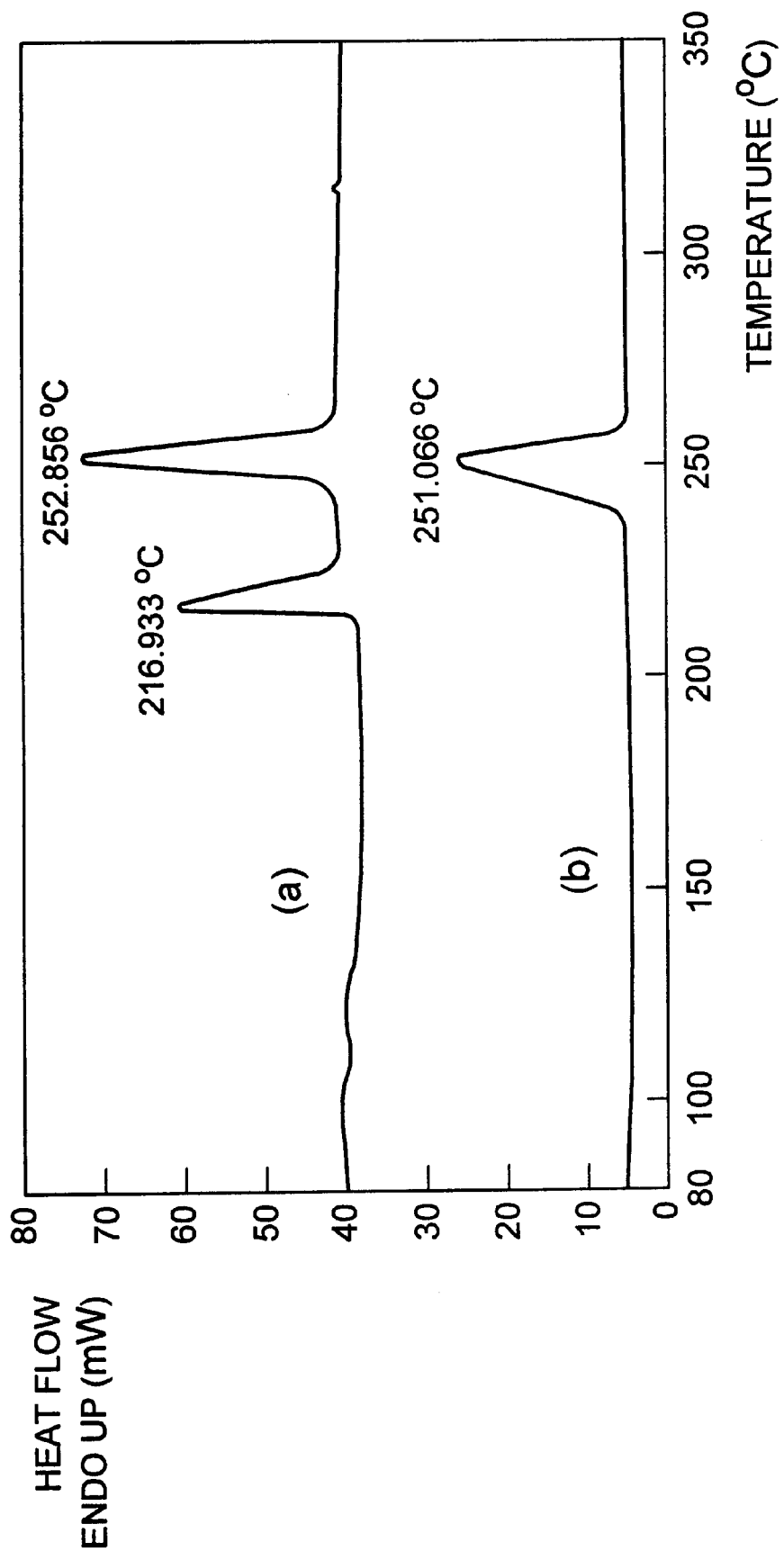
FIG. 5 represents a graph showing DSC of compensated polyaniline (C-SPAN). Differential calorimetric analysis as shown in curve (a) of the C-SPAN, showed that the polymer has a sharp melting point (Tm) of the order of 251° C. whereas the parent polymer in the doped or undoped state dose not show any Tm or sharp crystallization temperature, Tc, which is 180.6° C.

The compensated sulphonated polyaniline so obtained after treatment with aqueous NaOH is soluble in water which is a novel characteristic of the said compensated polyaniline. Conducting compensated polymer polyaniline is as such insoluble in any organic solvent whereas the undoped form of the polymer is soluble in organic solvents like N-methyl pyrrolidinone (NMP), dimethyl sulphoxide (DMSO), dimethyl formamide (DMF) etc. By attaching a sulphonate group in the polymeric backbone of polyaniline and compensating the polymer with alkali hydroxide like NaOH, we are able to prepare a polymer soluble in water. Emeraldine base and doped conducting form of polyaniline is amorphous whereas the compensated sulphonated polyaniline prepared by us is crystalline in nature as determined by x.r.d. pattern of the polymer (FIG. 4). The fraction crystallinity estimated by comparing the integerated intensity of the peaks above the amorphous hump intensity is found to be 91%. Differential scanning calorimeter (DSC) curve of the compensated polyaniline shows a sharp melting point (Tm) at 251° C. and the crystallization temperature (Tc) at 180.60° C. (FIG. 5) whereas the parent polymer does not show any Tm or Tc. The compensated polyaniline shows absorption bands at 305 and 535 nm whereas the emeraldine base show absorption bands at 320 and 620 nm in NMP.

The following examples are given to illustrate the process of the present invention and should not be construed to limit the scope of the present invention.

EXAMPLE 1

Preparation of Water Soluble Polyaniline:

To 2.0 gms of emeraldine base, 24% oleum (40 ml) is added at 0° C. under constant stirring for 4 hours. When the emeraldine base is completely dissolved, stirring was continued further for 24 hours at 25° C. so that there is complete incorporation of sulphonate moiety in the polymeric backbone. To this bluish violet solution, methanol—water mixture is added in the ratio of 80:20 under constant stirring till a green precipitate comes out. This solution is filtered and the green cake so obtained is dried under vacuum at 50° C. The sulphonated polyaniline so obtained is treated with aqueous 0.1 M NaOH so that sodium is attached alongwith the sulphonated moiety and a blue solution is obtained. The solution was dried at 70° C. and the polymer so obtained was used for corrosion prevention studies as detailed below:

An iron electrode of nominal dimensions of 5×2.5 cm2 was weighed with a precision electronic balance and found to weigh 16.48279 gms. Next a 1.0 N HCl solution was prepared and the weighed electrode was kept in the acid solution for 30 minutes. After this treatment, the weight of the iron piece was again measured and found to be 16.3150 gms thereby resulting in a loss of 0.16779 gms. Next another iron piece of the same nominal dimension was taken and dipped in 1.0 N HCl containing 100 ppm of water soluble compensated sulphonated polymer. The weight loss in this case was also measured and found to be 0.03241 gms thereby giving corrosion inhibition efficiency of 80.6%.

EXAMPLE 2

To 2.0 gms of emeraldine base, 24% oleum (40 ml) is added at 0° C. under constant stirring for 5 hours. When the emeraldine base is completely dissolved, stirring was kept continued further for 30 hours at 30° C. so that there is complete incorporation of sulphonate moiety in the polymeric backbone. To this bluish violet solution, methanol—water mixture is added in the ratio of 80:20 under constant stirring till a green precipitate comes out This solution is filtered and the green cake of polymer so obtained is dried under vacuum at 50 C. The sulphonated polyaniline so obtained is treated with aqueous 0.1 M NaOH so that sodium is attached alongwith the sulphonated moiety and a blue solution is obtained. The solution was dried at 70° C. and the polymer so obtained was used for corrosion prevention studies as detailed below:

An iron electrode of nominal dimensions of 5×2.5 cm$^2$ was weighed with a precision electronic balance and found to weigh 16.48279 gms. Next a 1.0 N HCl solution was prepared and the weighed electrode was kept in the acid solution for 30 minutes. After this treatment, the weight of the iron piece was again measured and found to be 16.3150 gms thereby resulting in a loss of 0.16779 gms. Next another iron piece of the same nominal dimension was taken and dipped in 1.0 N HCl containing 200 ppm of water soluble compensated sulphonated polymer. The weight loss in this case was also measured and found to be 0.03241 gins thereby giving corrosion inhibition efficiency of 88.8%

EXAMPLE 3

To 2.0 gms of emeraldine base, 24% oleum (40 ml) is added at 0° C. under constant stirring for 5 hours. When the emeraldine base is completely dissolved, stirring was kept continued further for 24 hours at 30° C. so that there is complete incorporation of sulphonate moiety in the polymeric backbone. To this bluish violet solution, methanol—water mixture is added in the ratio of 80:20 under constant stirring till a green precipitate comes out. This solution is filtered and the green cake of polymer so obtained is dried under vacuum at 60° C. The sulphonated polyaniline so obtained is treated with aqueous 0.1 M NaOH so that sodium is attached alongwith the sulphonated moiety and a blue solution is obtained. The solution was dried at 75° C. and the polymer so obtained was used for corrosion prevention studies as detailed below:

An iron electrode of nominal dimensions of 5×2.5 cm$^2$ was weighed with a precision electronic balance and found to weigh 16.48279 gms. Next a 1.0 N HCl solution was prepared and the weighed electrode was kept in the acid solution for 30 minutes. After this treatment, the weight of the iron piece was again measured and found to be 16.3150 gms thereby resulting in a loss of 0.16779 gms. Next another iron piece of the same nominal dimension was taken and dipped in 1.0 N HCl containing 400 ppm of water soluble compensated sulphonated polymer. The weight loss in this case was also measured and found to be 0.00835 gms thereby giving corrosion inhibition efficiency of 95.02%

EXAMPLE 4

To 2.0 gms of emeraldine base, 24% oleum (40 ml) is added at 0° C. under constant stirring for 5 hours. When the emeraldine base is completely dissolved, stirring was kept continued further for 40 hours at 25° C. so that there is complete incorporation of sulphonate moiety in the polymeric backbone. To this bluish violet solution, methanol—water mixture is added in the ratio of 80:20 under constant stirring till a green precipitate comes out. This solution is filtered and the green cake of polymer so obtained is dried under vacuum at 60° C. The sulphonated polyaniline so obtained is treated with aqueous NaOH of strength 0.1 M so that sodium is attached alongwith the sulphonated moiety and a blue solution is obtained. The solution was dried at 75° C. by indirect heating and the polymer so obtained was used for corrosion protection studies as detailed below:

An iron electrode of nominal dimensions of 5×2.5 cm$^2$ was weighed with a precision electronic balance and found to weigh 11.8740 gms. Next a 3.5% NaCl solution was prepared and the weighed electrode was kept in the solution for 7 days. After this treatment, the weight of the iron piece was again measured and found to be 11.62612 gms thereby resulting in a loss of 0.24788 gms. Next another iron piece of the same nominal dimension was taken and dipped 3.5% NaCl solution containing 500 ppm of water soluble compensated sulphonated polymer. The weight loss in this case was also measured and found to be 0.03110 gms thereby giving corrosion inhibition efficiency of 87.5% and indicating efficiency of corrosion inhibition by the compensated sulphonated polyaniline polymer added to the saline water solution.

EXAMPLE 5

To 2.0 gms of emeraldine base, 24% oleum (40 ml) is added at 0° C. under constant stirring for 6 hours. When the emeraldine base is completely dissolved, stirring was kept continued further for 36 hours at 30° C. so that there is complete incorporation of sulphonate moiety in the polymeric backbone. To this bluish violet solution, methanol—water mixture is added in the ratio of 90:10 under constant stirring till a green precipitate comes out. This solution was then kept as such for 6 hours and then filtered and the green cake of polymer so obtained is treated with aqueous KOH of strength 1.0 M so that ptassium is attached alongwith the sulphonated moiety and a blue solution is obtained. The solution was dried at 80° C. by indirect heating and the polymer so obtained was named KSPAN and was used for corrosion protection studies as detailed below:

An iron electrode of nominal dimensions of 5×2.5 cm$^2$ was weighed with a precision electronic balance and found to weigh 11.1550 gms. Next a 1.0 N HCl solution was prepared and the weighed electrode was kept in the acid solution for 30 minutes. After this treatment, the weight of the iron piece was again measured and found to be 1 1.0510 gms thereby resulting in a loss of 0.104 gms. Next another iron piece of the same nominal dimension was taken and dipped in 1.0 N HCl containing 500 ppm of water soluble compensated sulphonated polymer. The weight loss in this case was also measured and found to be 0.004 grns thereby giving corrosion inhibition efficiency of 96% and indicating efficiency of corrosion inhibition by the compensated sulphonated polyaniline polymer added to the acid solution.

EXAMPLE 6

To 2.0 gms of emeraldine base, 24% oleum (200 ml) is added at 0° C. under constant stirring for 6 hours. When the emeraldine base is completely dissolved, stirring was kept continued further for 43 hours at 30° C. so that there is complete incorporation of sulphonate moiety in the polymeric backbone. To this bluish violet solution, methanol—water mixture is added in the ratio of 90:10 under constant stirring till a green precipitate comes out This solution was then kept as such for 15 hours and then filtered and the green cake of polymer so obtained is treated with aqueousLiOH of strength 1.0 M so that lithium is attached alongwith the sulphonated moiety and a blue solution is obtained. The solution was dried at 60° C. by indirect heating and the polymer so obtained was named LiSPAN and was used for corrosion protection studies as detailed below:

An iron electrode of nominal dimensions of 5×2.5 cm$^2$ was weighed with a precision electronic balance and found to weigh 11.1550 gms. Next a 1.0 N HCl solution was prepared and the weighed electrode was kept in the acid solution for 30 minutes. After this treatment, the weight of the iron piece was again measured and found to be 11.0510 gms thereby resulting in a loss of 0.104 gms. Next another iron piece of the same nominal dimension was taken and dipped in 1.0 N HCl containing 500 ppm of water soluble compensated sulphonated polymer (LiSPAN). The weight loss in this case was also measured and found to be 0.010 gms thereby giving corrosion inhibition efficiency of 90.3% and indicating efficiency of corrosion inhibition by the compensated sulphonated polyaniline polymer added to the acid solution.

The comparative examples 7 and 8 have been added to show the inefficiency of the polymer prepared by the Epstien method, as a polymer having anticorrosive characteristics.

EXAMPLE 7 (COMPARATIVE EXAMPLE)

To 0.5 gms of emeraldine base, 24% oleum (40 ml) is added at 0° C. under constant stirring for 4 hours. The resultant bluish solution was precipitated with methanol while maintaining the temperature at 0° C., leads to the formation of a green precipitate. The solution is filtered and the green cake so obtained is dried under vacuum at 50° C. The sulphonated polyaniline so obtained is treated with aqueous 0.1 M NaOH sothat sodium is attached alongwith the sulphonated moiety and a blue solution is obtained. The solution was dried at 75° C. The UV-visible absorption spectra of NaSPAN prepared by Epstein method in water gives absorption bands at 313 and 586 nm. The polymer so obtained was used for corrosion prevention studies as detailed below:

An iron electrode of nominal dimensions of 5×2.5 cm$^2$ was weighed with a precision electronic balance and found to weigh 26.37457 gms. Next a 1.0 N HCl solution was prepared and the weighed electrode was kept in the acid solution for 30 minutes. After this treatment, the weight of the iron piece was again measured and found to be 26.36058 gms thereby resulting in a loss of 0.01399 gms. Next another iron piece of the same nominal dimension was taken and dipped in 1.0 N HCl containing 100 ppm of water soluble polymer. The weight gain in this case was observed and found to be 0.01773 gms.

EXAMPLE 8 (COMPARATIVE EXAMPLE)

To 0.5 gms of emeraldine base, 24% oleum (40 ml) is added at 0° C. under constant stirring for 4 hours. The resultant bluish solution was precipitated with methanol while maintaining the temperature at 0° C., leads to the formation of a green precipitate. The solution is filtered and the green cake so obtained is dried under vacuum at 55° C. The sulphonated polyaniline so obtained is treated with aqueous 0.1 M NaOH so that sodium is attached alongwith the sulphonated moiety and a blue solution is obtained. The solution was dried at 80° C. and the polymer so obtained was used for corrosion prevention studies as detailed below:

An iron electrode of nominal dimensions of 5×2.5 cm$^2$ was weighed with a precision electronic balance and found to weigh 26.37457 gms. Next a 1.0 N HCl solution was prepared and the weighed electrode was kept in the acid solution for 30 minutes. After this treatment, the weight of the iron piece was again measured and found to be 26.36058 gms thereby resulting in a loss of 0.01399 gms. Next another iron piece of the same nominal dimension was taken and dipped in 1.0 N HCl containing 200 ppm of water soluble polymer. The weight gain in this case was observed and found to be 0.01783 gms .

The results of the experiments are summarized in Tables 1 and 2

Table—1 gives the data for the corrosion inhibition studies for the compensated sulphonated polyaniline of the present invention.

Table—2 gives the test results of corrosion inhibition studies done as per the Epstein method described in the comparative examples 1 and 2.

TABLE 1

| Sr. No. | Compensated PANI made in | Medium & duration of study | Polymer (ppm) | Weight loss gms) | Inhibition efficiency % |
|---|---|---|---|---|---|
| 1. | NaOH* | 1.0 N HCl –30 minutes | 100 | 0.03241 | 80.6 |
| 2. | NaOH* | 1.0 N HCl –30 minutes | 200 | 0.01871 | 88.8 |
| 3. | NaOH* | 1.0 N HCl –30 minutes | 400 | 0.00835 | 95.02 |
| 4. | NaOH* | 1.0 N HCl –30 minutes | 500 | 0.00263 | 98.42 |
| 5 | NaOH** | 3.5% NaCl –7 days | 500 | 0.03110 | 87.5 |
| 6 | KOH*** | 1.0 N HCl –30 minutes | 200 | 0.006 | 94.2 |
| 7. | KOH*** | 1.0 N HCl –30 minutes | 500 | 0.004 | 96.15 |
| 8. | LiOH*** | 1.0 N HCl –30 minutes | 500 | 0.010 | 90.16 |

*Weight loss of iron electrode in 1.0 N HCl = 0.16779 gms
**Weight loss of iron electrode in 3.5% NaCl = 0.24788 gms
***Weight loss of iron electrode in 1.0 N HCl = 0.1040 gms

TABLE 2

Corrosion efficiency as per Epstein method (Comparative example 7 & 8)

| Sr. No. | Compensated PANI made in | Medium & duration of study | Polymer (ppm) | Weight loss (gms) | Inhibition efficiency % |
|---|---|---|---|---|---|
| 1. | NaOH# | 1.0 N HCl | 100 | 0.01773 | Increase in Corrosion rate |
| 2. | NaOH# | 1.0 N HCl | 200 | 0.01783 | Increase in Corrosion rate |
| 3. | NaOH# | 1.0 N HCl | 500 | 0.0364 | Increase in Corrosion rate |

Water soluble polyaniline prepared by Epstein method

The main advantages of the present invention are:

1. The water soluble polymer acts as a corrosion inhibitor to iron based materials in saline water and acid medium.
2. Only a tiny amount of the substance is required to be mixed in the corroding medium for effective anticorrosion property.

A corrosion inhibitor is a chemical substance which when added in small concentrations to a system retard the reaction of the metal with the atmospheric environment like oxygen, air and water. These are added to many systems like cooling towers , pipelines, ballast tanks, oil and gas production units and many other units where metals like iron, copper and aluminium are susceptible for corrosion. Organic inhibitors are of primary importance because organic molecules inhibits corrosion by adsorbing at the metal solution interface because of their strong adsorption on metallic surfaces due to the presence of pi-electrons. However inhibition efficiencies are not very high because of van der walls repulsion between neighbouring monomeric units, thus leaving the majority of the metal surface unprotected. We envisage that soluble compensated sulphonated polyaniline having quartenary ammonium nitrogen and pi-electrons from the aromatic nucleus would help in a strong adsorption of polymer on the iron surface to give uniform coverage by minimizing the van der walls repulsive forces so that the maximum metal surface can be protected. The sulphonated group attached to the polymeric backbone remains facing the electrolyte to prevent the corroding ions from reaching the iron surface and to give increased corrosion inhibition efficiencies.

We claim:

1. A compensated sulphonated polyaniline having a melting point of 251.06° C. and a crystallization point of 180.60° C. for use as corrosion inhibitor, said compensated sulphonated polyaniline having the formula:

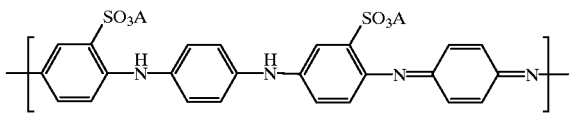

Where (A=Na$^+$, K$^+$, Li$^+$).

2. A compensated sulphonated polyaniline as claimed in claim 1 wherein the compensated sulphonated polyaniline has the following characteristics:
   a) is environmentally stable in air and moisture;
   b) is crystalline in nature with orthorhombic structure;
   c) is water soluble; and
   d) is a corrosion inhibitor.

3. A process for the preparation of compensated sulphonated polyaniline having a melting point of 251.06° C. and a crystallization point of 180.60° C. useful for corrosion inhibition which comprises:
   (i) adding oleum to a polymer at a temperature in the range of –5° C. to 5° C.;
   (ii) stirring the mixture as obtained in (i) continuously under cooling for a period in the range of 4–6 hours;
   (iii) completely digesting the polymer in oleum so that there is complete sulphonation of the polymeric backbone for a period in the range of 24 hours to 48 hours to yield a sulphonated polymer;
   (iv) mixing the digested polymer with an organic solvent and water to precipitate the sulphonated polymer which is then filtered to obtain a green cake;
   (v) drying the green cake so obtained in step (iv) at a temperature in the range of 50 to 60° C.;

(vi) treating the green cake so obtained in step (v) with an alkali hydroxide solution; and (vii) drying the solution so obtained in step (vi) at a temperature in the range of 70° C. to 80° C. to obtain compensated sulphonated polyaniline water soluble polymer for corrosion inhibition.

4. A process as claimed in claim 3, wherein the polymer is selected from the group consisting of emeraldine base, leucoemeraldine.

5. A process as claimed in claim 3, wherein percentage of oleum used is in the range of 24 to 60%.

6. A process as claimed in claim 3, wherein the organic solvent used as a mixture with water is selected from the group consisting of methanol, ethanol, isopropanol.

7. A process as claimed in claim 3, wherein the organic solvent and water is in the range of 80:20 and 90:10.

8. A process as claimed in claim 3, wherein the alkali hydroxide is selected from a group consisting of sodium hydroxide, potassium hydroxide and lithium hydroxide.

9. A process as claimed in claim 3, wherein the strength of the alkali hydroxide used ranges between 0.1 M to 1.0 M.

10. A process as claimed in claim 3 wherein water soluble polyaniline prepared by the process of the present invention is crystalline in nature.

11. A process as claimed in claim 3 wherein a water soluble polyaniline as prepared by the process of the present invention, is thermally stable up to 320° C.

* * * * *